US012613364B2

(12) United States Patent
Sasaki et al.

(10) Patent No.: US 12,613,364 B2
(45) Date of Patent: Apr. 28, 2026

(54) GLASS DIFFRACTION GRATING AND METHOD OF PRODUCING THE SAME

(71) Applicants: NALUX CO., LTD., Osaka (JP); RIKEN, Wako (JP); TOYOTA SCHOOL FOUNDATION, Nagoya (JP)

(72) Inventors: Minoru Sasaki, Nagoya (JP); Noboru Ebizuka, Wako (JP); Makio Nishimaki, Osaka (JP); Takayuki Okamoto, Niiza (JP); Kazuya Yamamoto, Osaka (JP); Makoto Okada, Osaka (JP); Yutaka Yamagata, Wako (JP); Kazuto Saiki, Kusatsu (JP); Yusuke Nakauchi, Kusatsu (JP)

(73) Assignees: NALUX CO., LTD., Osaka (JP); RIKEN, Wako (JP); TOYOTA SCHOOL FOUNDATION, Nagoya (JP)

( * ) Notice: Subject to any disclaimer, the term of this patent is extended or adjusted under 35 U.S.C. 154(b) by 335 days.

(21) Appl. No.: 18/468,120

(22) Filed: Sep. 15, 2023

(65) Prior Publication Data

US 2024/0004111 A1 Jan. 4, 2024

Related U.S. Application Data

(63) Continuation of application No. PCT/JP2022/006859, filed on Feb. 21, 2022.
(Continued)

(51) Int. Cl.
*G02B 5/18* (2006.01)
(52) U.S. Cl.
CPC .................................. *G02B 5/1857* (2013.01)

(58) Field of Classification Search
CPC ...... G02B 5/1866; G02B 5/1852; G02B 5/18; G02B 5/1857
See application file for complete search history.

(56) References Cited

U.S. PATENT DOCUMENTS

| | | | |
|---|---|---|---|
| 2005/0128592 A1 | 6/2005 | Nishii et al. | |
| 2005/0260349 A1* | 11/2005 | Pawlowski | ............ B29C 33/42 |
| | | | 427/282 |

(Continued)

FOREIGN PATENT DOCUMENTS

| | | |
|---|---|---|
| EP | 3 550 339 A1 | 10/2019 |
| JP | 2002-048907 A | 2/2002 |

(Continued)

OTHER PUBLICATIONS

Noboru, English translation for JP-2020056973-A (Year: 2020).*
(Continued)

*Primary Examiner* — Jonathan Y Jung
(74) *Attorney, Agent, or Firm* — SQUIRE PATTON BOGGS (US) LLP

(57) ABSTRACT

A method of producing a diffraction grating of borosilicate glass or barium borosilicate glass, the method comprising the steps of forming a grating on a surface of a silicon wafer the grating through the Bosch process; forming an oxide film on a surface of the grating by heating and exposure to water vapor of the silicon wafer; removing the oxide film using hydrofluoric acid; making the surface provided with the grating of the silicon wafer and a surface of a glass plate undergo anodic bonding; heating the silicon wafer and the glass plate bonded to each other; polishing a surface opposite to the boded surface of the silicon wafer and a surface opposite to the boded surface of the glass plate; and removing silicon from the glass plate by selective etching using xenon difluoride.

7 Claims, 16 Drawing Sheets

Related U.S. Application Data

(60) Provisional application No. 63/165,361, filed on Mar. 24, 2021.

(56) References Cited

U.S. PATENT DOCUMENTS

| | | | |
|---|---|---|---|
| 2012/0198935 A1 | 8/2012 | Samson et al. | |
| 2014/0285891 A1* | 9/2014 | Heitzmann | G02B 5/1857 216/26 |
| 2016/0265125 A1* | 9/2016 | Yokoyama | C25D 5/48 |
| 2018/0180793 A1 | 6/2018 | Fattal | |
| 2018/0246330 A1 | 8/2018 | Fattal | |
| 2019/0018186 A1 | 1/2019 | Fattal | |
| 2019/0288473 A1 | 9/2019 | Niwa et al. | |
| 2020/0249377 A1* | 8/2020 | Niwa | G02B 5/1852 |
| 2021/0157050 A1 | 5/2021 | Fattal | |

FOREIGN PATENT DOCUMENTS

| | | | |
|---|---|---|---|
| JP | 2004-093634 A | | 3/2004 |
| JP | 2005-037872 A | | 2/2005 |
| JP | 2019-510998 A | | 4/2019 |
| JP | 2020056973 A | * | 4/2020 |
| WO | 2011/081692 A2 | | 7/2011 |
| WO | 2017/039820 A1 | | 3/2017 |
| WO | 2017/039825 A1 | | 3/2017 |
| WO | 2017/131816 A1 | | 8/2017 |
| WO | 2018/100868 A1 | | 6/2018 |
| WO | 2018/155556 A1 | | 8/2018 |

OTHER PUBLICATIONS

International Search Report and Written Opinion dated May 17, 2022 corresponding to International Patent Application No. PCT/JP2022/006859, with English translation.

A. Amnache and L.G. Frechette, "High-Aspect Ratio Microstructures in Borosilicate Glass by Molding and Sacrificial Silicon Etching: Capabilities and Limits," Solid-State Sensors, Actuators and Microsystems Workshop, Hilton Head Island, South Carolina, Jun. 5-9, 2016.

* cited by examiner

20

10

20

10

30

10

10

10

50

10

50

10

A

50

10

B

50

10'

50

300

300

300

400

410

420

425

430

W

400'

405'

403'

410'

420'

425'

430'

W

GLASS DIFFRACTION GRATING AND METHOD OF PRODUCING THE SAME

CROSS REFERENCE TO RELATED APPLICATION

This is a Continuation of International Patent Application No. PCT/JP2022/006859 filed Feb. 21, 2022, which designates the U.S., and which claims priority from U.S. Provisional Patent Application No. 63/165,361, dated Mar. 24, 2021. The contents of these applications are hereby incorporated by reference.

TECHNICAL FIELD

The present invention relates to a glass diffraction grating and a method of producing the same.

BACKGROUND ART

There is a need for a transmission diffraction optical element with a great angular dispersion used in astronomic observation in an artificial satellite orbit or in a spectroscope for a planetary probe, fore example. In order to produce a highly efficient transmission diffraction optical element with a great angular dispersion, a volume binary or a trapezoid diffraction grating with deep grooves made of glass that is highly radiation-resistant and that has an aspect ratio of 2 or greater and a period of 0.2 to 10 micrometers is required.

In the prior art, a method of producing a diffraction grating having deep grooves on a surface of quartz glass through plasma etching using a metal film of chromium (Cr) or the like as a mask is known. The method, however, has the following problems.

Firstly, since etching onto quartz glass is carried out through ion bombardment, the quartz glass is damaged in a process of producing a diffraction grating having deep grooves. Accordingly, it is difficult to flatten a surface of the grating to the level required in optics. In addition, particles of quartz glass removed through the plasma etching adhere to a wall surface and the like of the grating and therefore surface roughness is further deteriorated.

Secondly, the deeper the grooves, the higher resistance of a mask is required. In the case of a mask having a fine pattern, the groove contour tends to be tapered when the resistance of the mask is insufficient. When the thickness of a film of chrome (Cr) or the like is increased in order to increase the resistance of the mask, a crack and a separation are generated in the film itself.

Thirdly, when the grooves are deep, the number of ions that reach the bottom and ions that do not reach the bottom shave sides of ridges so that bowing appears in the sides of each ridge. Taper and bowing that have not been taken into account in the design deteriorate the optical performance.

Because of the above-described problems of the method, a diffraction grating with the aspect ratio of 2 or greater can hardly be produced by the above-described method.

As another method of producing a glass diffraction grating with a high aspect ratio, a method using a SOQ (Silicon on Quartz) substrate has been developed (Patent document 1, for example). In the method disclosed in Patent document 1, however, it is difficult to obtain silicon dioxide (quartz glass; $SiO_2$) by completely oxidizing silicon. A refractive index of portions obtained by incomplete oxidation (silicon monoxide: SiO, disilicon trioxide: $Si_2O_3$) is greater than that of quartz glass (SiO: nd=1.97, $SiO_2$: nd=1.46). Accordingly, characteristics are quite different from those of the design.

Further, in a cooling process from a temperature in the process of oxidation (approximately 1000° C.) to the room temperature, the diffraction grating suffers warping because of a difference in coefficient of linear thermal expansion between silicon or silicon monoxide and silicon dioxide. In order to obtain a glass diffraction grating of sufficiently satisfactory quality in shape, material and characteristics, the manufacturing process has to be adjusted extremely precisely.

As sill another method, a method in which borosilicate glass is filled in a mold of silicon to produce a glass diffraction grating has been developed (Non-patent document 1, for example). However, the period of a grating produced by the above-described method is a few tens of micrometers and the period is approximately ten times as great as the period of a diffraction grating that is appropriate for the above-described purpose. Thus, by the above-described method a glass diffraction grating having a grating period of 10 micrometers or smaller that is appropriated for the above-described purpose cannot be produced.

Thus, a glass diffraction grating, the aspect ratio of grooves of the grating being 2 or greater and the period of the grating being 10 micrometers or smaller, and a method of producing the same have not been developed. Accordingly, there is a need for a glass diffraction grating, the aspect ratio of grooves of the grating being 2 or greater and the period of the grating being 10 micrometers or smaller, and a method of producing the same.

PRIOR ART DOCUMENT

Patent Document

Patent document 1: JP202056973A

Non-Patent Document

Non-patent document: A. Amnache and L. G. Frechette, "High-aspect ratio microstructures in borosilicate glass by molding and sacrificial silicon etching: capabilities and limits", Solid-State Sensors, Actuators and Microsystems Workshop Hilton Head Island, South Carolina, Jun. 5-9, 2016

The object of the present invention is to provide a need for a glass diffraction grating, the aspect ratio of grooves of the grating being 2 or greater and the period of the grating being 10 micrometers smaller, and a method of producing the same.

SUMMARY OF THE INVENTION

A method of producing a diffraction grating according to a first aspect of the present invention is for producing a diffraction grating of borosilicate glass or barium borosilicate glass, the period of the grating being from 0.2 to 10 micrometers and the aspect ratio of grooves of the grating being 2 or greater. The method includes the steps of forming a grating on a surface of a silicon wafer through the Bosch process (cyclic etching); forming an oxide film on a surface of the grating by heating and exposure to water vapor of the silicon wafer; removing the oxide film using hydrofluoric acid; making the surface provided with the grating of the silicon wafer and a surface of a glass plate undergo anodic bonding in a container kept at the degree of vacuum of 0.01 to 0.1 pascals; heating the silicon wafer and the glass plate that have been bonded to each other so as to melt glass and to fill spaces formed between ridges of the grating of silicon with the molten glass; polishing a surface opposite to the boded surface of the silicon wafer and a surface opposite to the boded surface of the glass plate; and removing silicon from the glass plate by selective etching using xenon difluoride gas.

Since the producing method includes the step of forming an oxide film on a surface of the grating by heating and exposure to water vapor of the silicon wafer and the step of removing the oxide film using hydrofluoric acid after the Bosch process, scallops that have been generated in the Bosch process on a side of each ridge of the grating can be flattened and surface roughness of 10 nanometers or smaller can be realized. Accordingly, optical performance of the glass diffraction grating can be improved. Further, since the producing method includes the step of removing silicon from the glass plate by selective etching using xenon difluoride gas, the degree of purity of material of the glass diffraction grating can be improved. Accordingly, optical performance of the glass diffraction grating can be improved.

The method of producing a diffraction grating according to a first embodiment of the first aspect of the present invention further includes a thermal oxidation process in which the glass plate is made to undergo heating and exposure to water vapor after the step of removing silicon from the glass plate by selective etching.

According to the present embodiment, through the additional thermal oxidation process, oxides of silicon such as silicon monoxide (SiO) that has been left unetched can be changed to silicon dioxide (SiO) that has the same quality with glass.

In the method of producing a diffraction grating according to a second embodiment of the first aspect of the present invention, the step of heating the silicon wafer and the glass plate that have been bonded to each other is carried out using a hot isostatic pressing machine.

A glass diffraction grating according to a second aspect of the present invention is a diffraction grating of borosilicate glass or barium borosilicate glass, the period of the grating being from 0.2 to 10 micrometers and the aspect ratio of grooves of the grating being 2 or greater.

In the glass diffraction grating according to a first embodiment of the second aspect of the present invention, a radius of curvature of a side of a ridge of the diffraction grating, the ridge being in a substantially rectangular shape and the side being substantially in the direction in which the height of the diffraction grating is measured, is ten times as great as the period of the diffraction grating or greater.

By the shape of the diffraction grating of the present embodiment satisfactory performance can be obtained.

In the glass diffraction grating according to a second embodiment of the second aspect of the present invention, a ratio of the width of each ridge to the period of the grating rages from 0.1 to 0.9.

In the glass diffraction grating according to a third embodiment of the second aspect of the present invention, an arithmetic average roughness on a side of a ridge of the grating is 10 nanometers or smaller.

By the shape of the diffraction grating of the present embodiment satisfactory performance can be obtained.

In the glass diffraction grating according to a fourth embodiment of the second aspect of the present invention, in a cross section including a straight line in the direction in which the period of the diffraction grating is measured and a straight line in the direction in which the height of the diffraction grating is measured, an angle $\theta$ formed between a side in the direction in which the period is measured and a side substantially in the direction in which the height is measured of a ridge that is in a substantially rectangular shape is equal to or greater than 70 degrees and equal to or less than 88 degrees.

The reasons why the angle should preferably be equal to or greater than 70 degrees and equal to or less than 88 degrees are below.

Firstly, by changing the angle $\theta$ from the right angle to an acute angle, the efficiency of spectral diffraction of the p polarized wave in which the electric field oscillates in an incident plane containing the incident ray and the reflected ray and the efficiency of spectral diffraction of the s polarized wave in which the electric field oscillates in a plane perpendicular to the incident plane can be made closer to each other and consequently the total efficiency of diffraction can be improved.

Secondly, by changing the angle $\theta$ from the right angle to an acute angle, the filling of glass into the spaces formed by the grating of silicon between the silicon wafer 10 and the glass plate 50 is more easily carried out in step S1050 as described later.

DESCRIPTION OF EMBODIMENTS

Figure 1:
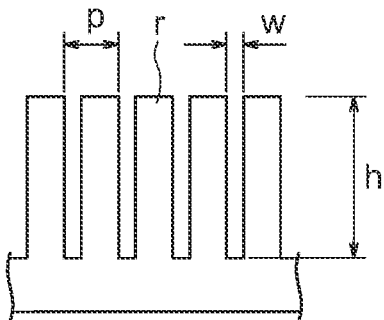
FIG. 1 shows a glass diffraction grating according to an embodiment of the present invention.

FIG. 1 shows a glass diffraction grating according to an embodiment of the present invention. In a glass diffraction grating according to the embodiment, the grating period P ranges from 0.2 micrometers to 10 micrometers, the grating height h ranges from 0.4 micrometers to 200 micrometers and the aspect ratio of grooves h/w is 2 or greater. "w" represents a distance between ridges r of the grating. The duty ratio (P·w)/P rages from 0.1 to 0.9. Material of the grating is borosilicate glass or barium borosilicate glass.

Figure 2:
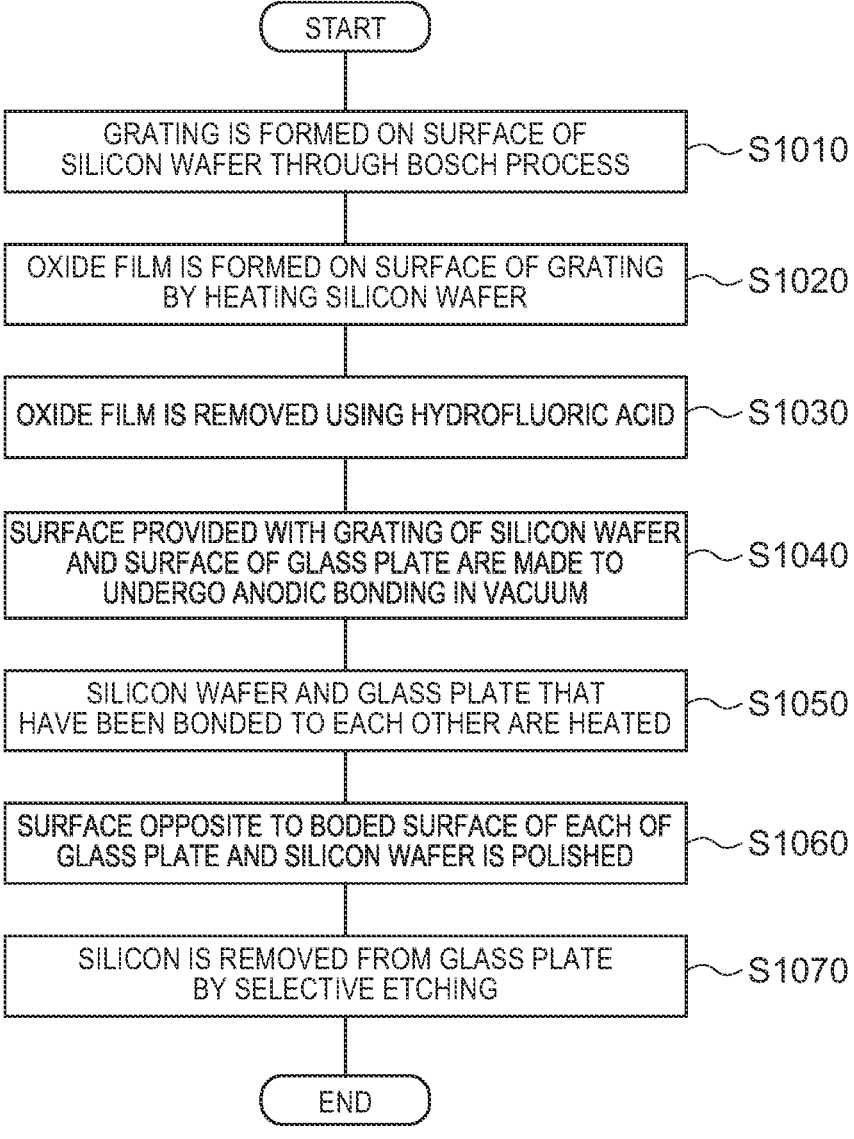
FIG. 2 is a flowchart for describing a method of producing a glass diffraction grating according to an embodiment of the present invention.

FIG. 2 is a flowchart for describing a method of producing a glass diffraction grating according to an embodiment of the present invention.

In step S1010 of FIG. 2 a surface of a silicon wafer 10 is coated with photoresist and a grating pattern is drawn on the photoresist through mask lithography, laser beam lithography, electron beam lithography, a stepper, laser interferometric lithography, or the like. Then a grating is formed on the surface of the silicon wafer 10 by making the silicon undergo etching through the Bosch process.

Figure 3A:
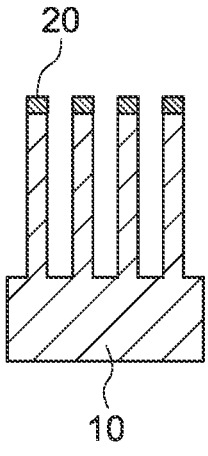
FIG. 3A shows a grating on the silicon wafer formed after the Bosch process.

FIG. 3A shows a grating on the silicon wafer 10 formed after the Bosch process. On the top of each ridge of the grating photoresist 20 remains.

Figure 11:
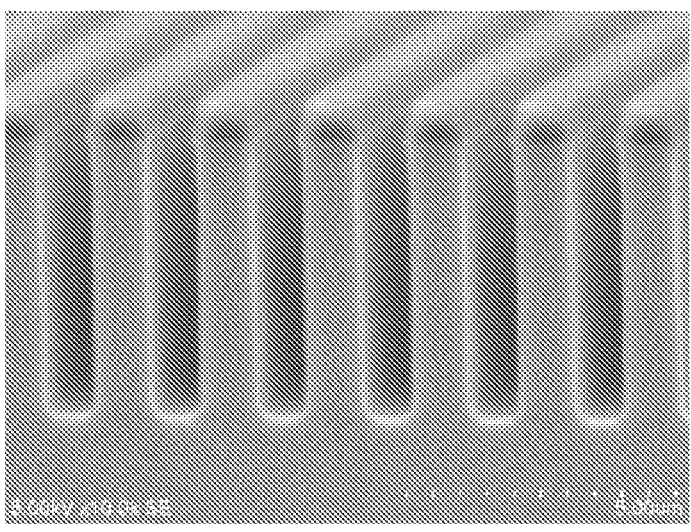
FIG. 11 is a SEM (scanning electron microscope) image of the silicon wafer provided with the grating formed after the Bosch process.

FIG. 11 is a SEM (scanning electron microscope) image of the silicon wafer 10 provided with the grating formed after the Bosch process. The image of FIG. 11 corresponds to FIG. 3A. The scale division shown on the images of FIG. 11 and other drawings is 0.5 micrometers. The period of the grating is approximately 2 micrometers.

In step S1020 of FIG. 2 the silicon wafer 10 provided with the grating, from which the photoresist has been removed, is heated in a heating furnace to form an oxide film on the surface of the grating.

Figure 20:
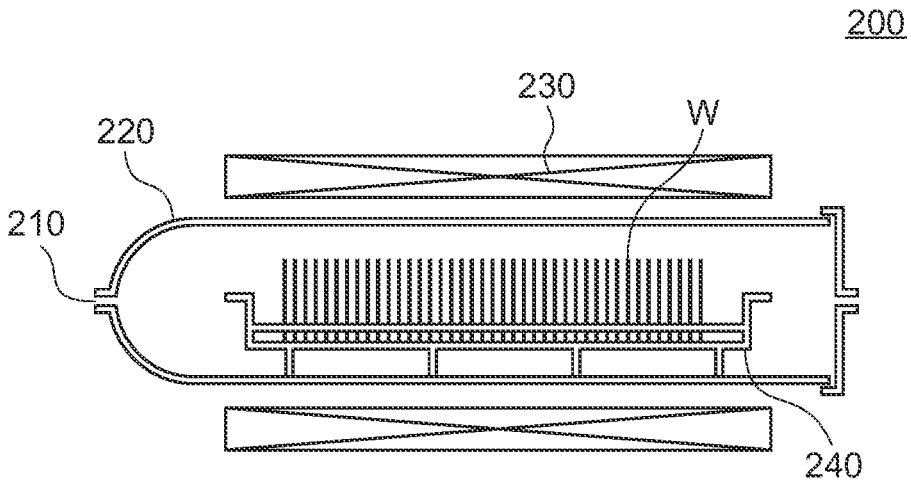
FIG. 20 shows an electric furnace used for heating the silicon wafer.

FIG. 20 shows an electric furnace 200 used for heating the silicon wafer 10. The silicon wafer 10 is placed on a port 240 in a quartz pipe 220 and heated by a heater 230 provided outside the quartz pipe 220. In FIG. 20 the silicon wafer 10 is represented as W. By way of example, the heating temperature is 1000 degrees (° C.) and the heating time is 20 minutes. Oxygen and hydrogen are fed into the quartz pipe 220 through a gas inlet 210 and an oxide film is formed on the surface of the grating of silicon using water vapor generated by combustion. By way of example, a thickness of the oxide film is 350 nanometers.

Figure 4:
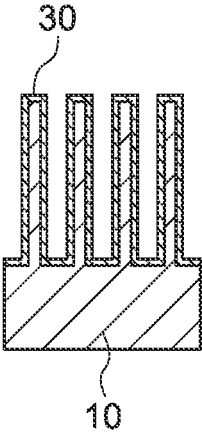
FIG. 4 shows a grating on the silicon wafer after the heating.

FIG. 4 shows a grating on the silicon wafer 10 after the heating. An oxide film 30 has been formed on the surface of the grating.

Figure 12:
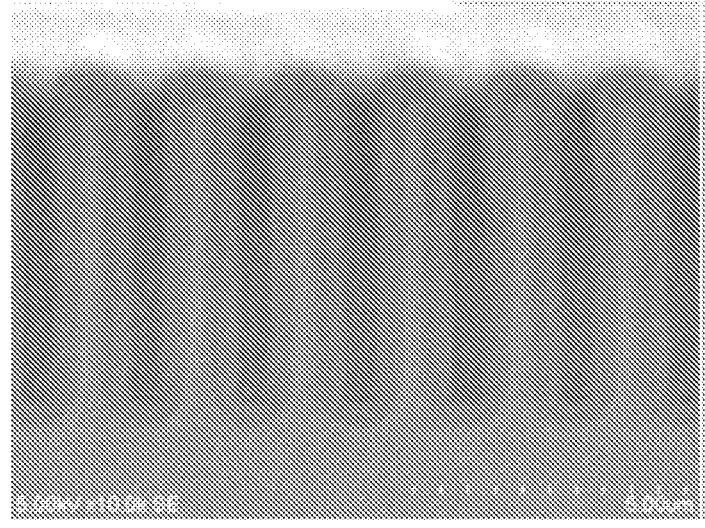
FIG. 12 is a SEM image of the grating on the silicon wafer after the heating.

FIG. 12 is a SEM image of the grating on the silicon wafer 10 after the heating. The image of FIG. 12 corresponds to FIG. 4.

In step S1030 of FIG. 2 the oxide film on the surface of the grating is removed using hydrofluoric acid. More specifically, the oxide film is removed by immersing the silicon wafer 10 provided with the grating into hydrofluoric acid in a container in a draft chamber.

Figure 5A:
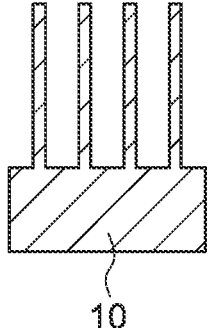
FIG. 5A shows a grating on the silicon wafer after the treatment with hydrofluoric acid.

FIG. 5A shows a grating on the silicon wafer 10 after the treatment with hydrofluoric acid.

Figure 13:
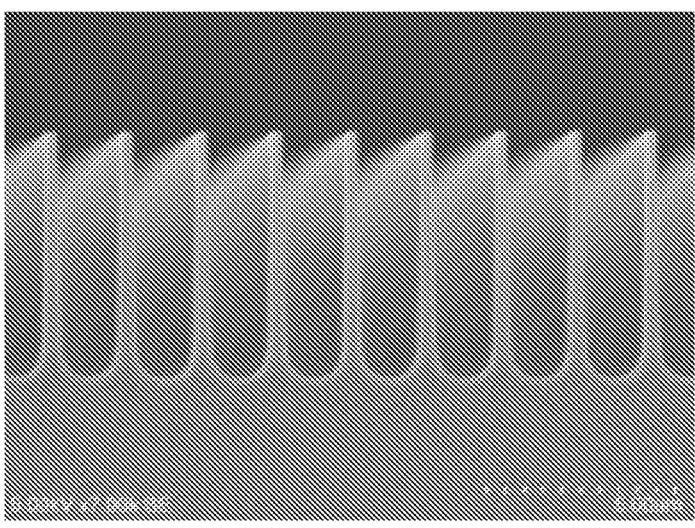
FIG. 13 shows a SEM image of the grating on the silicon wafer after the treatment with hydrofluoric acid.
Figure 14:
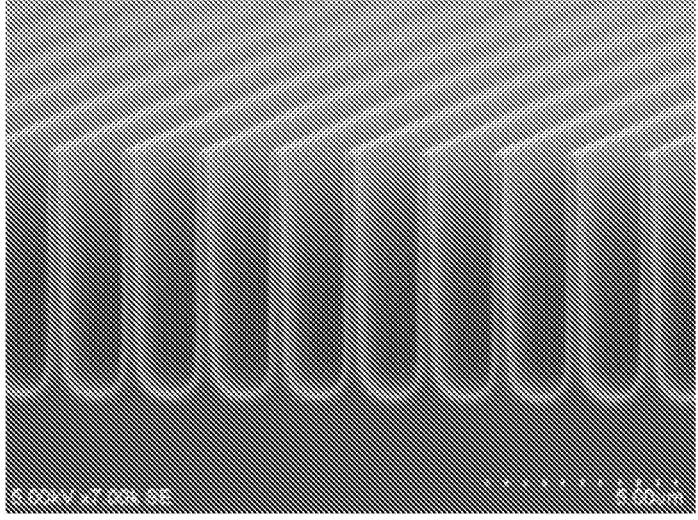
FIG. 14 shows a SEM image of the grating on the silicon wafer 10 after the treatment with hydrofluoric acid.

Each of FIG. 13 and FIG. 14 shows a SEM image of the grating on the silicon wafer 10 after the treatment with hydrofluoric acid. The image of FIG. 13 is a side view of the grating and the image of FIG. 14 is a view from above. The images of FIG. 13 and FIG. 14 correspond to FIG. 5A.

The reason that an oxide film is formed on the surface of the grating in step S1020 and then the oxide film is removed in step S1030 is to reduce roughness on side surfaces of ridges of the grating. On side surfaces of ridges of the grating after the Bosch process shown in FIG. 11, plural scallops have been formed in the direction perpendicular to the direction of the height of the grating. The height of the scallops rages from several nanometers to several tens of nanometers. By having the oxide film to be formed and then to be removed, the plural scallops are removed so that the surface roughness is reduced. An arithmetic average roughness Ra after step S1030 is 10 nanometers or smaller. In step S1020, a ratio of a thickness of a portion of the oxide film formed outwardly from the position of the original surface of the silicon wafer and a thickness of a portion of the oxide film formed inwardly from the position is approximately 3 to 2. Since the oxide film is removed in step S1030, the above-described ratio should be taken in to account when the dimensions of the grating on the silicon wafer are determined in step S1010 and the thickness of the oxide film is determined in S1020.

In step S1040 of FIG. 2, the surface provided with the grating of the silicon wafer 10 and a surface of a glass plate are made to undergo anodic bonding in a vacuum.

Figure 21:
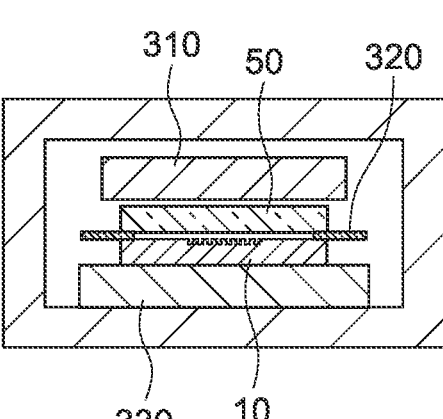
FIG. 21 shows a chamber in which anodic bonding is carried out.
Figure 22:
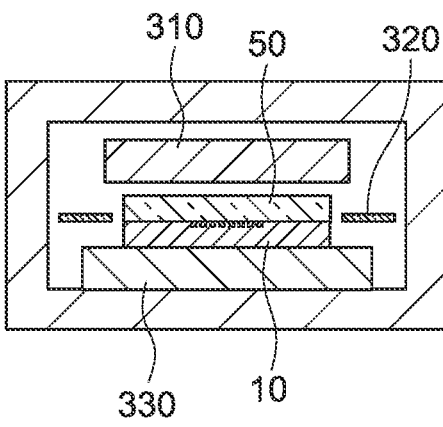
FIG. 22 shows a chamber in which anodic bonding is carried out.
Figure 23:
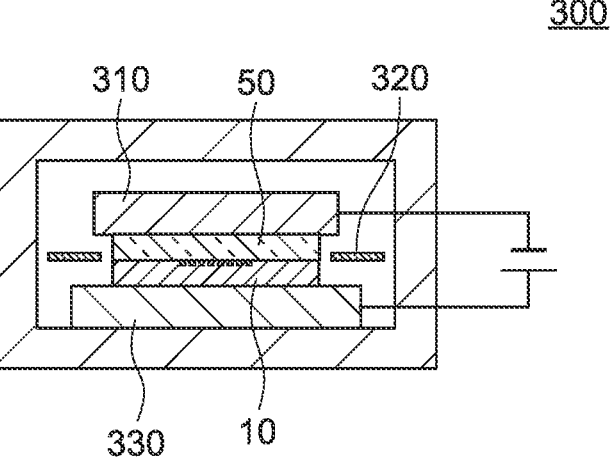
FIG. 23 shows a chamber in which anodic bonding is carried out.

Each of FIGS. 21-23 shows a chamber 300 in which the anodic bonding is carried out.

As shown in FIG. 21, the silicon wafer 10 provided with the grating and a glass plate 50 that sandwich spacers 320 in a rod shape between the surface provided with the grating of the silicon wafer 10 and a surface of the glass plate 50 are placed on a base 330 in the chamber 300. The degree of vacuum in the chamber 300 is made to be 0.01 to 0.1 pascals and the temperature is increased up to be 400° C. by heating. By the presence of the spacers a degree of vacuum in spaces between ridges of the grating is also made to be a value described above.

Then, as shown in Fi. 22, the spacers 320 are removed so as to bring the surface provided with the grating of the silicon wafer 10 and the surface of the glass plate 50 into contact with each other.

Then, as shown in Fi. 23, a negative voltage of −500 to −1000 volts is applied across the glass plate via a pressure plate 310 and the base 330 while applying a pressure of approximately 10 kilopascals to the silicon wafer 100 and the glass plated 50 by the pressure plate 310.

Figure 24:
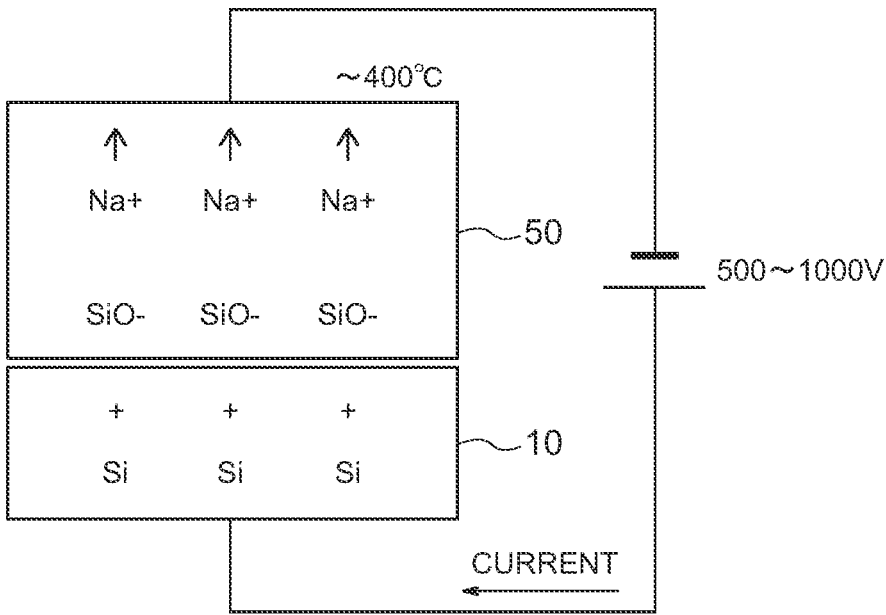
FIG. 24 illustrates the principle of anodic bonding.

FIG. 24 illustrates the principle of anodic bonding. Heating the glass plate 50 enhances the mobility of sodium ions (Na$^+$) in borosilicate glass or barium borosilicate glass. When the silicon wafer 10 and the glass plate 50 are brought into contact with each other and the silicon wafer 10 and the glass plate 50 are connected respectively to the positive electrode and the negative electrode of a power source, the sodium ions move toward the negative electrode. As a result, in the glass plate 50 a sodium ion deficient layer is generated in the vicinity of the interface with the silicon wafer 10. Since an excessive amount of negative ions exists in the layer, the layer becomes negatively charged. In the silicon wafer 10, a certain amount of positive charge that corresponds to the negative charge is generated in the vicinity of the interface with the glass plate 50. Accordingly, the surface of the silicon wafer 10 and the surface of the glass plate 50 attract each other by the Coulomb force acting between the positive charge and the negative charge and the both surfaces are brought into contact and tightly fixed.

Figure 6:
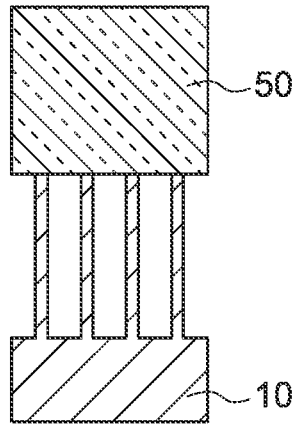
FIG. 6 shows the silicon wafer 10 and the glass plate 50 after the anodic bonding.

FIG. 6 shows the silicon wafer 10 and the glass plate 50 after the anodic bonding. The degree of vacuum in spaces formed by the grating of silicon between the silicon wafer 10 and the glass plate 50 is 0.01 to 0.1 pascals as described above.

Figure 15:
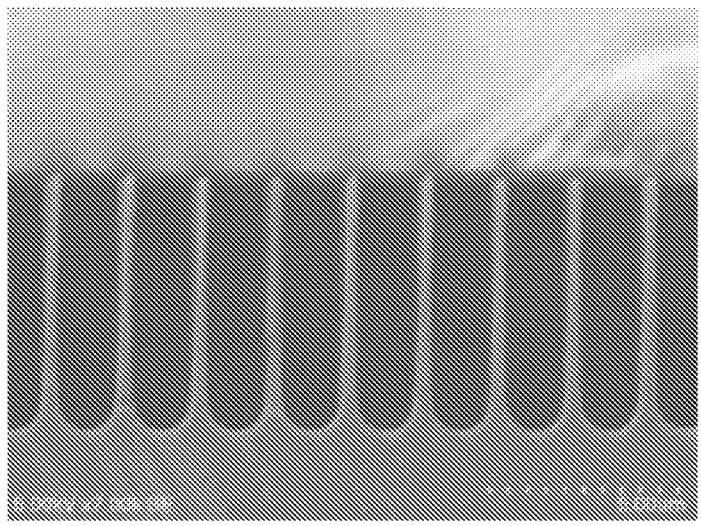
FIG. 15 is a SEM image of the silicon wafer and the glass plate after anodic bonding.

FIG. 15 is a SEM image of the silicon wafer 10 and the glass plate 50 after the anodic bonding. The image of FIG. 15 corresponds to FIG. 6.

In step S1050 of FIG. 2, the silicon wafer 10 and the glass plate 50 that have been bonded to each other are heated in an electric furnace. As the electric furnace, that shown in FIG. 20 can be used. The heating temperature is 1100 degrees (° C.), the heating time is 30 minutes and the gas to be fed is nitrogen. The pressure in the furnace is the atmospheric pressure. The glass is molten by heating and the spaces formed by the grating of silicon between the silicon wafer 10 and the glass plate 50, the spaces being kept at a relatively low pressure, are filled with the molten glass by the action of the atmospheric pressure.

In place of an electric furnace, a hot isostatic pressing machine or a hot-pressing machine can be used.

Figure 25A:
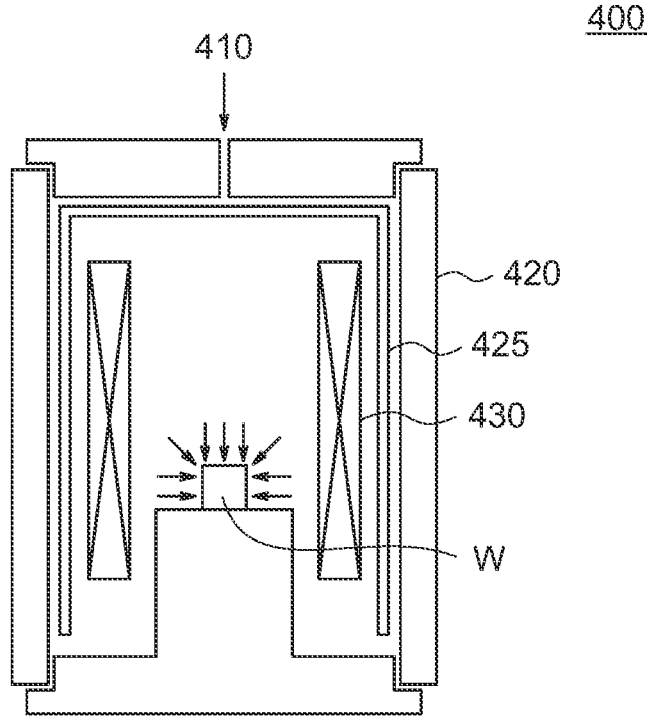
FIG. 25A shows a hot isostatic pressing machine.

FIG. 25A shows a hot isostatic pressing machine 400. The silicon wafer 10 bonded with the glass plate 50 represented by W is placed in a pressure vessel 420 and an inactive gas such as argon or nitrogen is fed into the pressure vessel 420 through a gas inlet 410. By keeping the pressure inside the pressure vessel 420 at 0.1 to 200 megapascals and heating the inside of the pressure vessel 420, using a heater 430, filling of glass into the spaces formed by the grating of silicon between the silicon wafer 10 and the glass plate 50 is accelerated. A thermal barrier is represented by 425.

Figure 25B:
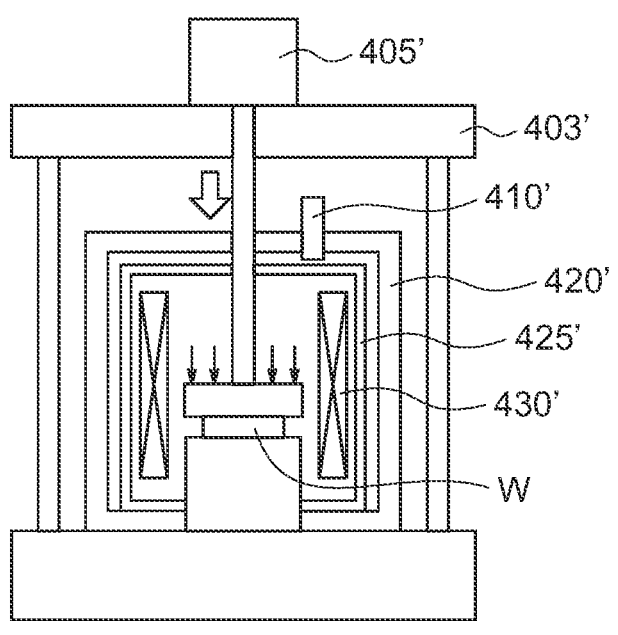
FIG. 25B shows a hot-pressing machine.

FIG. 25B shows a hot-pressing machine 400'. The silicon wafer 10 bonded with the glass plate 50 that is represented by W is placed in a heating chamber 425' in a chamber 420' and an inactive gas such as argon or nitrogen is fed into the chamber 420' through a gas inlet 410'. By heating the inside by a heater 430' while pressing the work piece W by a cylinder 405', the filling of glass into the spaces formed by the grating of silicon between the silicon wafer 10 and the glass plate 50 is accelerated.

Figure 7:
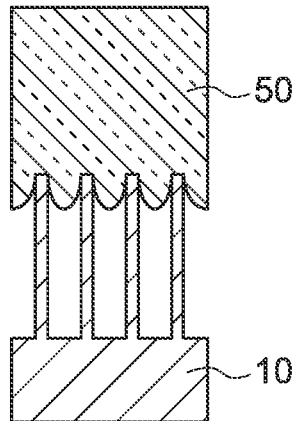
FIG. 7 shows a state in which the spaces formed by the grating of silicon between the silicon wafer and the glass plate are being filled with glass.

FIG. 7 shows a state in which the spaces formed by the grating of silicon between the silicon wafer 10 and the glass plate 50 are being filled with glass.

Figure 8:
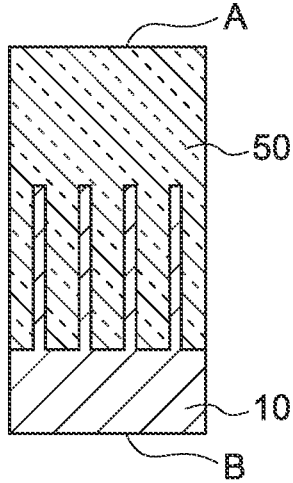
FIG. 8 shows a state in which the spaces formed by the grating of silicon between the silicon wafer and the glass plate have been filled with glass.

FIG. 8 shows a state in which the spaces formed by the grating of silicon between the silicon wafer 10 and the glass plate 50 have been filled with glass. The glass filling the spaces between the ridges of the grating of silicon forms a glass grating.

Figure 16:
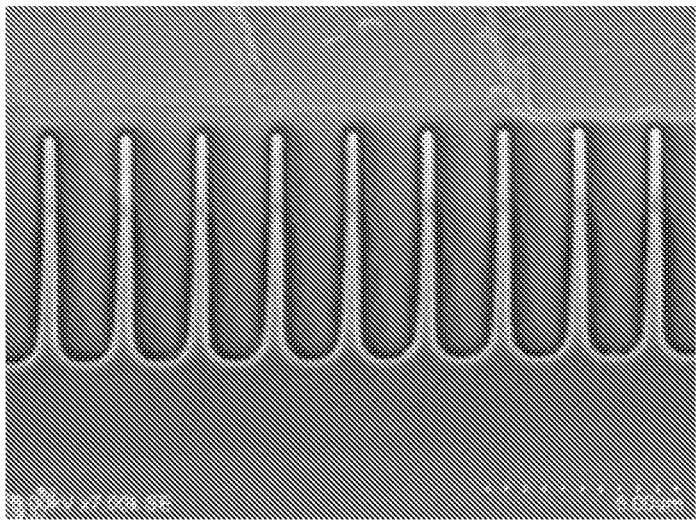
FIG. 16 is a SEM image of a state in which the spaces formed by the grating of silicon between the silicon wafer and the glass plate have been filled with glass.

FIG. 16 is a SEM image of a state in which the spaces formed by the grating of silicon between the silicon wafer 10 and the glass plate 50 have been filled with glass. The image of FIG. 16 corresponds to FIG. 8.

When borosilicate glass or barium borosilicate glass is heated in steps S1040 and S1050, additives contained in the glass such as sodium and aluminum are separated out on a surface of the glass plate 50 and may deteriorate optical performance of the diffraction grating. Accordingly, the surface of the glass plate 50 should preferably be etched by approximately 500 nanometers using hydrofluoric acid before step S1040 or step S1050 in order to remove the additives.

Figure 17:
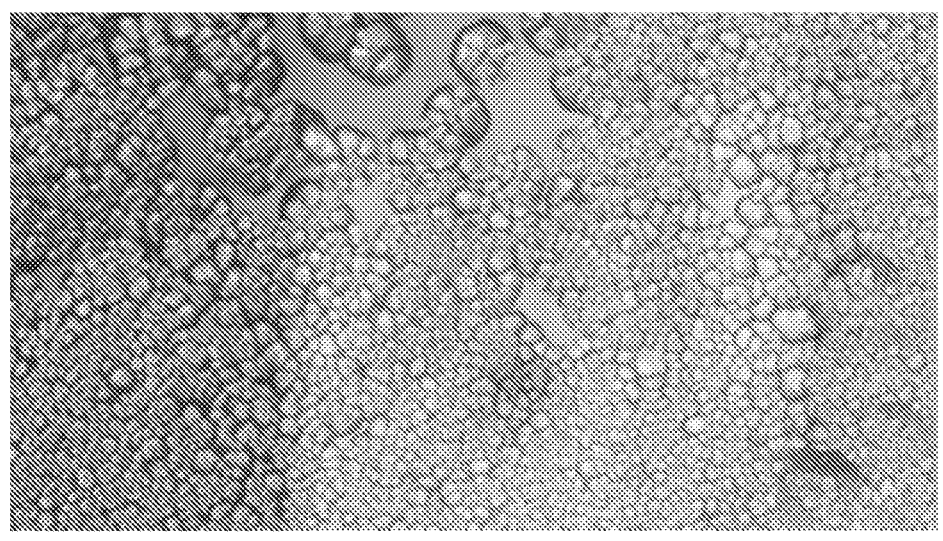
FIG. 17 shows the surface (surface A in FIG. 8) of the glass plate after step S1050, the surface having not undergone the treatment with hydrofluoric acid.

FIG. 17 shows the surface (surface A in FIG. 8) of the glass plate 50 after step S1050, the surface having not undergone the treatment with hydrofluoric acid.

Figure 18:
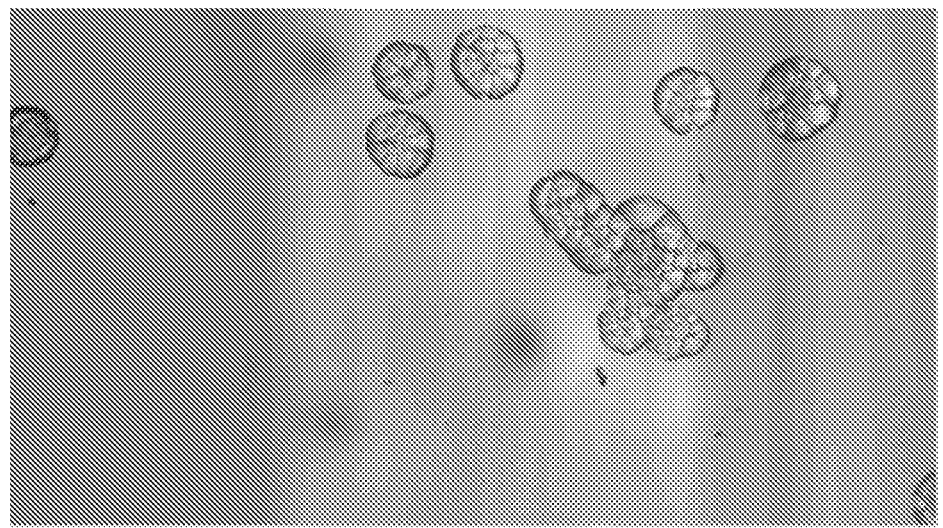
FIG. 18 shows the surface (surface A in FIG. 8) of the glass plate 50 after step S1050, the surface having undergone the treatment with hydrofluoric acid.

FIG. 18 shows the surface (surface A in FIG. 8) of the glass plate 50 after step S1050, the surface having undergone the treatment with hydrofluoric acid.

When the image of FIG. 17 and the image of FIG. 18 are compared with each other, it can be understood that the treatment with hydrofluoric acid has reduced additives that have been separated out on the surface of the glass plate 50.

In step S1060 of FIG. 2, the surface of the glass plate 50 opposite to the boded surface (surface A in FIG. 8) and the surface of the silicon wafer 10 opposite to the boded surface (surface B in FIG. 8) are polished.

Figure 26:
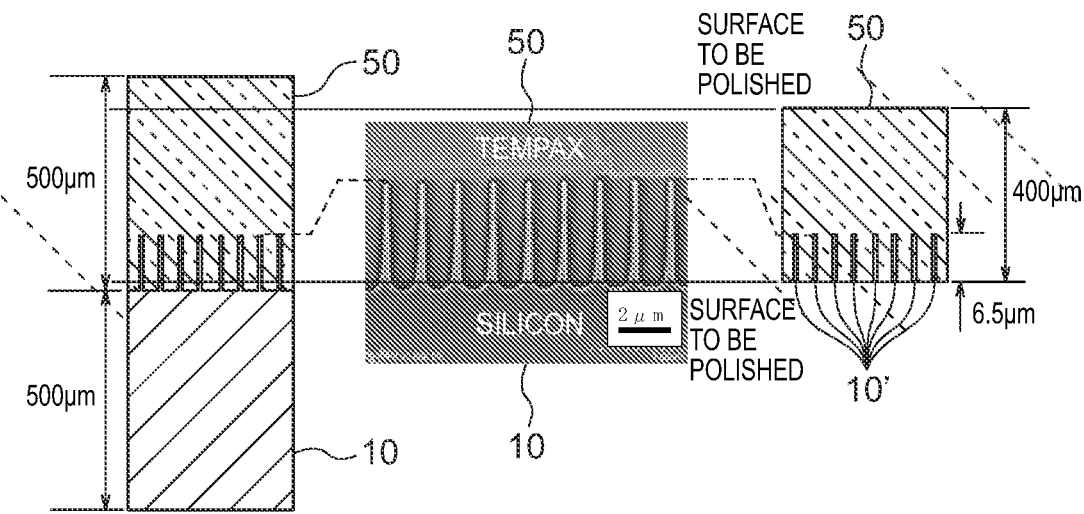
FIG. 26 illustrates polishing of the surface of the glass plate 50 opposite to the boded surface (surface A in FIG. 8) and the surface of the silicon wafer 10 opposite to the boded surface (surface B in FIG. 8)

FIG. 26 illustrates polishing of the surface of the glass plate 50 opposite to the boded surface (surface A in FIG. 8) and the surface of the silicon wafer 10 opposite to the boded surface (surface B in FIG. 8). Silicon that is not surrounded by the glass grating is removed by the polishing. The polishing is carried out by a CMP (Chemical Mechanical Polishing) method. Roughness of each surface after the polishing is 1 nanometer or smaller. Thickness of each of the glass plate 50 and the silicon wafer 10 before the polishing is 500 micrometers. Thickness of the glass plate 50 after the polishing is 400 micrometers and height (depth) of the grating is 6.5 micrometers.

Figure 9:
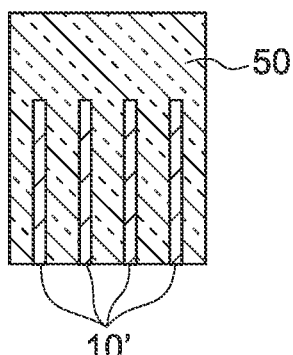
FIG. 9 shows the glass plate after the polishing.

FIG. 9 shows the glass plate 50 after the polishing. Silicon 10' remains between the ridges of the glass grating.

In step S1070 of FIG. 2, the silicon between the ridges of the glass grating is removed by selective etching using xenon difluoride (XeF$_2$) gas.

Figure 27:
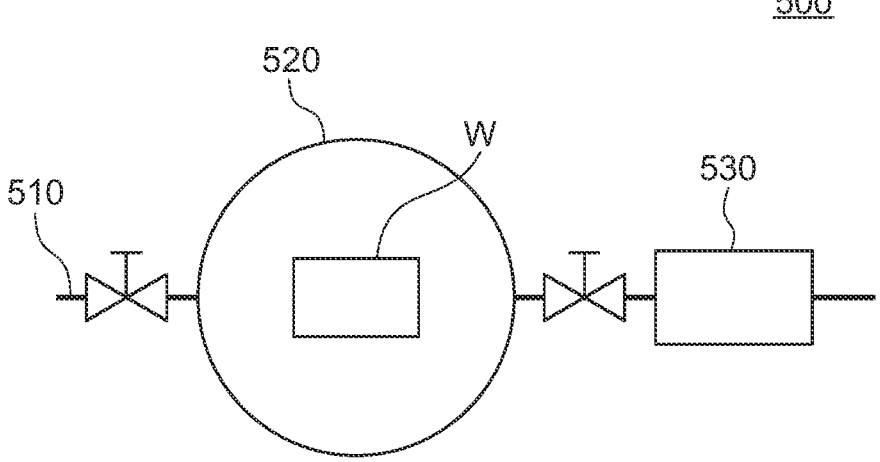
FIG. 27 shows an apparatus for removing silicon in the glass plate by etching using xenon difluoride ($XeF_2$) gas.

FIG. 27 shows an apparatus 500 for removing silicon in the glass plate 50 by etching using xenon difluoride (XeF$_2$) gas. The glass plate 50 represented by W is placed in a vacuum chamber 520 and xenon difluoride (XeF$_2$) gas is fed into the vacuum chamber 520 through a gas inlet 510 by a rotary pump 530. Since the bond between xenon (Xe) and fluoride (F) is week, reaction of fluoride (F) with silicon (Si) occurs and silicon tetrafluoride (SiF$_4$) is generated and evaporated. Thus, silicon (Si) alone undergoes selective etching leaving oxides (including the glass). When oxides of silicon such as silicon monoxide (SiO) is left unetched, a thermal oxidation process can be added to change the silicon monoxide (SiO) to silicon dioxide (SiO$_2$) that has a refractive index substantially equal to that of the glass. As the thermal oxidation process, a wet oxidation process, which has a high oxidation rate, is preferable.

Figure 10:
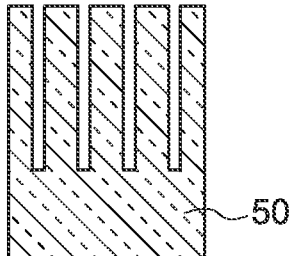
FIG. 10 shows the glass plate provided with the grating after step S1070.

FIG. 10 shows the glass plate 50 provided with the grating after step S1070.

Figure 19A:
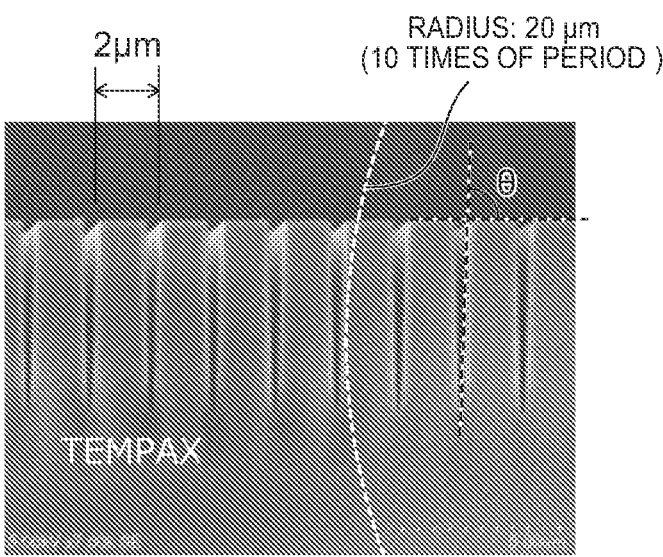
FIG. 19A is a SEM image of a cross section of the glass plate provided with the grating after step S1070.

FIG. 19A is a SEM image of a cross section of the glass plate 50 provided with the grating after step S1070. The image of FIG. 19A corresponds to FIG. 10.

According to the image of FIG. 19A, the period of the grating is 2 micrometers, the depth (height) of the grating is 6 micrometers, the aspect ratio of the grooves is 14 and the duty ratio is 0.785. In a cross section including a straight line in the direction in which the period of the diffraction grating is measured (the horizontal direction in FIG. 19A) and a straight line in the direction in which the height of the diffraction grating is measured (the vertical direction in FIG. 19A), the (acute) angle θ formed between a side in the direction in which the period is measured and a side substantially in the direction in which the height is measured of a ridge in a substantially rectangular shape is 88 degrees.

Figure 28:
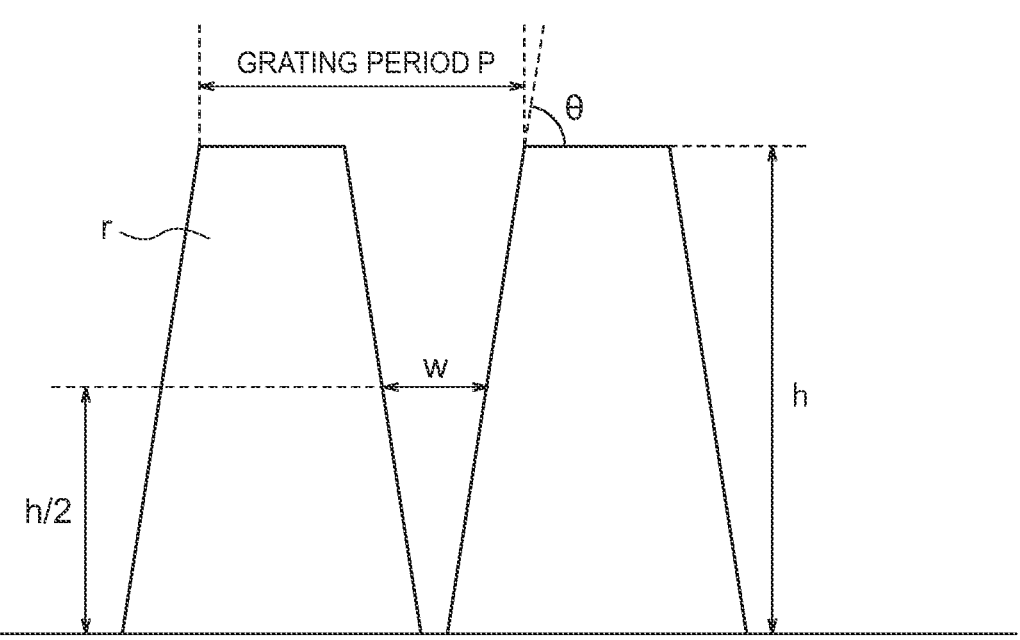
FIG. 28 illustrates how the duty ratio is determined when the angle $\theta$ is an acute angle.

FIG. 28 illustrates how the duty ratio is determined when the angle θ is an acute angle. A distance w between ridges r of the grating is measured at half the height of the ridges.

In general, the angle θ should preferably be equal to or greater than 70 degrees and less than 88 degrees. The reasons are below.

Firstly, by changing the angle θ from the right angle to an acute angle, the efficiency of spectral diffraction of the p polarized wave in which the electric field oscillates in an incident plane containing the incident ray and the reflected ray and the efficiency of spectral diffraction of the s polarized wave in which the electric field oscillates in a plane perpendicular to the incident plane can be made closer to each other and consequently the total efficiency of diffraction can be improved.

Secondly, by changing the angle θ from the right angle to an acute angle, the filling of glass into the spaces formed by the grating of silicon between the silicon wafer 10 and the glass plate 50 is more easily carried out in step S1050.

How to adjust the angle will be described below.

Concerning the oxidation film 30 shown in FIG. 4 which has been formed in step S1020 of FIG. 2, in actual fact, the thickness of the oxidation film increases with decrease in a distance to the top of the grating. Accordingly, after the oxidation film 30 has been removed in step S1030, ridges of the grating are tapered such that width of each ridge in the cross section decreases with decrease in a distance to the top of the grating.

Figure 5B:
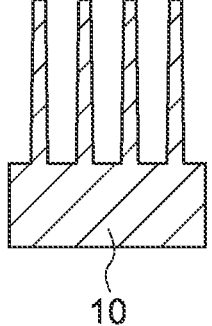
FIG. 5B corresponds to FIG. 5A and shows the silicon wafer with the grating having tapered ridges after the treatment with hydrofluoric acid.

FIG. 5B corresponds to FIG. 5A and shows the silicon wafer 10 with the grating having tapered ridges after the treatment with hydrofluoric acid.

When a glass grating is produced using the grating of silicon having tapered ridges, ridges of the glass grating are also tapered such that width of each ridge in the cross section decreases with decrease in a distance to the top of the grating. That is, the angle θ formed between a side in the direction in which the period is measured and a side substantially in the direction in which the height is measured of a ridge in a substantially rectangular shape turns out to be an acute angle.

When a grating of silicon is produced through the Bosch process in step S1010, a reverse-taper shape of ridges in which width of each ridge in the cross section increases with decrease in a distance to the top of the grating can be obtained by adjusting an etching process of silicon using sulfur hexafluoride (SF$_6$) plasma and a deposition process of a film for side wall protection using octafluorocyclobutane (C$_4$F$_8$) plasma.

Figure 3B:
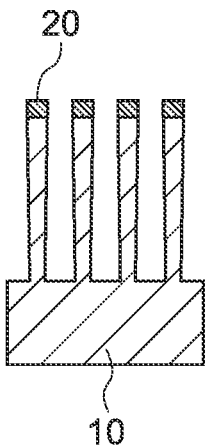
FIG. 3B corresponds to FIG. 3A and shows the silicon wafer with the grating having reverse-tapered ridges.

FIG. 3B corresponds to FIG. 3A and shows the silicon wafer 10 with the grating having reverse-tapered ridges.

By adjusting the shape of a grating of silicon before the formation of an oxide film, the shape of the grating of silicon after the formation of the oxide film and the removal of the oxide film and further the shape of a grating provided with the glass plate can be adjusted.

In summary, by adjusting the shape of ridges of a grating of silicon when the grating of silicon is produced through the Bosch process in step S1010, the angle (θ in FIG. 19A) formed between a side in the direction in which the period is measured and a side substantially in the direction in which the height is measured of a ridge in a substantially rectangular shape in a cross section including a straight line in the direction in which the period of the diffraction grating is measured (the horizontal direction in FIG. 19A) and a straight line in the direction in which the height of the diffraction grating is measured (the vertical direction in FIG. 19A) can be adjusted.

According to the image of FIG. 19A, a radius of curvature of a side of a ridge of the diffraction grating, the ridge being in a substantially rectangular shape and the side being substantially in the direction in which the height of the diffraction grating is measured, is ten times as great as the period of the diffraction grating or greater.

Figure 19B:
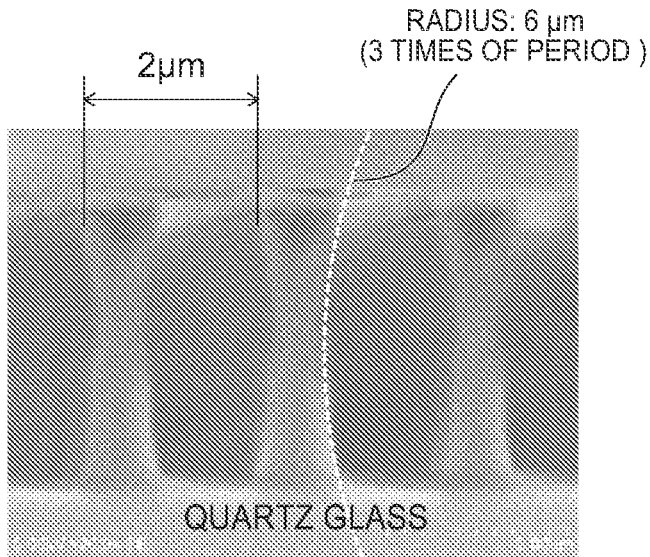
FIG. 19B is a SEM image of a cross section of a diffraction grating produced by a conventional method in which quartz glass is made to undergo plasma etching.

FIG. 19B is a SEM image of a cross section of a diffraction grating produced by a conventional method in which quartz glass is made to undergo plasma etching.

According to the image of FIG. 19B, the radius of curvature of a side substantially in the direction in which the height is measured of a ridge in a substantially rectangular shape is approximately three times as great as the period of the diffraction.

According to the present embodiment, because of a greater radius of curvature, a diffraction grating having a remarkably higher optical performance than a conventional one can be obtained.

What is claimed is:

1. A method of producing a diffraction grating of borosilicate glass or barium borosilicate glass, a period of the grating being from 0.2 to 10 micrometers and an aspect ratio of grooves of the grating being 2 or greater, the method comprising the steps of:

forming a grating on a surface of a silicon wafer through the Bosch process;

forming an oxide film on a surface of the grating by heating and exposure to water vapor of the silicon wafer;

removing the oxide film using hydrofluoric acid;

making the surface provided with the grating of the silicon wafer and a surface of a glass plate undergo anodic bonding in a container kept at the degree of vacuum of 0.01 to 0.1 pascals;

heating the silicon wafer and the glass plate that have been bonded to each other so as to melt glass and to fill spaces formed between ridges of the grating of silicon with the molten glass;

polishing a surface opposite to the bonded surface of the silicon wafer and a surface opposite to the bonded surface of the glass plate; and removing silicon from the glass plate by selective etching using xenon difluoride gas.

2. The method of producing a diffraction grating according to claim 1 further comprising a thermal oxidation process in which the glass plate is made to undergo heating and exposure to water vapor after the step of removing silicon from the glass plate by selective etching.

3. The method of producing a diffraction grating according to claim 1, wherein the step of heating the silicon wafer and the glass plate that have been bonded to each other is carried out using a hot isostatic pressing machine.

4. A glass diffraction grating of borosilicate glass or barium borosilicate glass, wherein a period of the glass diffraction grating is from 0.2 to 10 micrometers and an aspect ratio of grooves of the glass diffraction grating is 2 or greater, wherein a radius of curvature of a side of a ridge of the glass diffraction grating, the ridge being in a substantially rectangular shape and the side being substantially in the direction in which the height of the glass diffraction grating is measured, is ten times as great as the period of the glass diffraction grating or greater.

5. The glass diffraction grating according to claim 4, wherein a ratio of the width of each ridge to the period of the glass diffraction grating ranges from 0.1 to 0.9.

6. The glass diffraction grating according to claim 4, wherein an arithmetic average roughness on a side of a ridge of the glass diffraction grating is 10 nanometers or smaller.

7. The glass diffraction grating according to claim 4, wherein in a cross section including a straight line in the direction in which the period of the glass diffraction grating is measured and a straight line in the direction in which the height of the glass diffraction grating is measured, an angle θ formed between a side in the direction in which the period is measured and a side substantially in the direction in which the height is measured of a ridge that is in a substantially rectangular shape is equal to or greater than 70 degrees and equal to or less than 88 degrees.

\* \* \* \* \*